United States Patent
Tretter et al.

(10) Patent No.: US 7,248,693 B1
(45) Date of Patent: Jul. 24, 2007

(54) SECURE NETWORK-BASED SYSTEM FOR THE DISTRIBUTED PRINTING OF DOCUMENTS

(75) Inventors: Daniel R. Tretter, Mtn. View, CA (US); Thomas D. Kite, Beaverton, OR (US); Qian Lin, Santa Clara, CA (US); Hugh P. Nguyen, San Jose, CA (US); Ping Wah Wong, Sunnyvale, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/483,183

(22) Filed: Jan. 13, 2000

(51) Int. Cl.
*G09C 3/00* (2006.01)
*H04L 9/00* (2006.01)

(52) U.S. Cl. ........................... 380/55; 380/278
(58) Field of Classification Search ............ 380/55, 380/278; 713/185, 182
See application file for complete search history.

(56) References Cited

U.S. PATENT DOCUMENTS

| | | | |
|---|---|---|---|
| 5,144,667 A * | 9/1992 | Pogue et al. ............... 380/45 |
| 5,307,411 A * | 4/1994 | Anvret et al. ............. 713/169 |
| 5,483,653 A * | 1/1996 | Furman .................... 707/200 |
| 5,509,074 A * | 4/1996 | Choudhury et al. ........ 713/176 |
| 5,552,897 A * | 9/1996 | Mandelbaum et al. ...... 358/400 |
| 5,568,552 A * | 10/1996 | Davis ....................... 705/59 |
| 5,717,940 A * | 2/1998 | Peairs ...................... 715/515 |
| 6,181,436 B1 * | 1/2001 | Kurachi .................... 358/1.15 |
| 6,378,070 B1 * | 4/2002 | Chan et al. ............... 713/155 |
| 6,385,728 B1 * | 5/2002 | DeBry ..................... 713/201 |
| 6,442,687 B1 * | 8/2002 | Savage ..................... 713/156 |
| 6,738,901 B1 * | 5/2004 | Boyles et al. ............. 713/159 |
| 6,862,583 B1 * | 3/2005 | Mazzagatte et al. ....... 705/64 |

\* cited by examiner

*Primary Examiner*—Kambiz Zand
*Assistant Examiner*—Christopher J. Brown

(57) ABSTRACT

An Internet-based printing system allows for the distribution and printing of documents and images in a secure, controlled manner. The system includes a secure printer that receives, decrypts and prints documents supplied by a document server. Security of the system is realized by an aggregate of a secure communication protocol, smart card technology and the computational infeasibility of breaking a public key cryptographic system. The system may be used for electronic commerce, in which copies are made on a "pay-per-print" basis.

29 Claims, 5 Drawing Sheets

SECURE NETWORK-BASED SYSTEM FOR THE DISTRIBUTED PRINTING OF DOCUMENTS

BACKGROUND OF THE INVENTION

The present invention relates to a computer-based system for distributing and printing electronic documents. The present invention also relates to electronic commerce over the Internet.

Distributed computer systems such as the World Wide Web provide excellent vehicles for the timely dissemination of documents and images over broad geographical areas. The Web allows documents and images to be shared among different people in different geographic regions.

One scenario for a distributed computer system involves the sharing of documents between multiple corporate offices in different cities. The documents and images are stored in a central repository, where they can be managed and updated easily. Users of the Web can access the repository and obtain desired hardcopies immediately. It is quite common for some corporations to restrict the distribution of certain sensitive documents. These documents are typically tagged with a serial number, and each numbered document can only be delivered to an authorized person. Thus, security-protecting the documents from unauthorized use—is an important consideration to the successful implementation of such a system. Hence a system that provides the realization of distribute-and-print concept in a secure manner would be desirable.

Another scenario for a distributed computer system involves electronic commerce where, for example, a merchant sells valuable documents (e.g., out-of-print books, images of fine art) to a customer over the Internet. Not only is there a need for a secure way of delivering the documents and images over the Web, but there is also a need for a secure mechanism for controlling the number of hardcopies generated by the customer. In other words, a customer should be allowed to print only the specified number of copies for which he or she paid. Hence a secure printing system that provides a "per-per-print" service would also be desirable.

SUMMARY OF THE INVENTION

According to one aspect of the present invention, a system for the distributed printing of a document includes a computer network, a server connected to the network, and a printer connected to the network. The document is stored on the server. The printer uses a cryptographic key to establish an identity with the server via the network. After a document is ordered from the server via the network, the server encrypts the ordered document and places the encrypted document on the network. The printer retrieves the encrypted document from the network, decrypts the retrieved document, and prints the decrypted document.

The invention may be adapted for electronic commerce, in which a customer negotiates a document order via the Internet, and a document server sends the ordered documents to the printer. The printer then prints out high quality copies of the documents. However, the printer only prints the number of copies that is specified in the document order. Once the printing has been completed, the customer is automatically charged according to the type and number of documents that are printed. More generally, however, the invention may be used to distribute documents in a secure manner to authorized users on an unsecure network.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
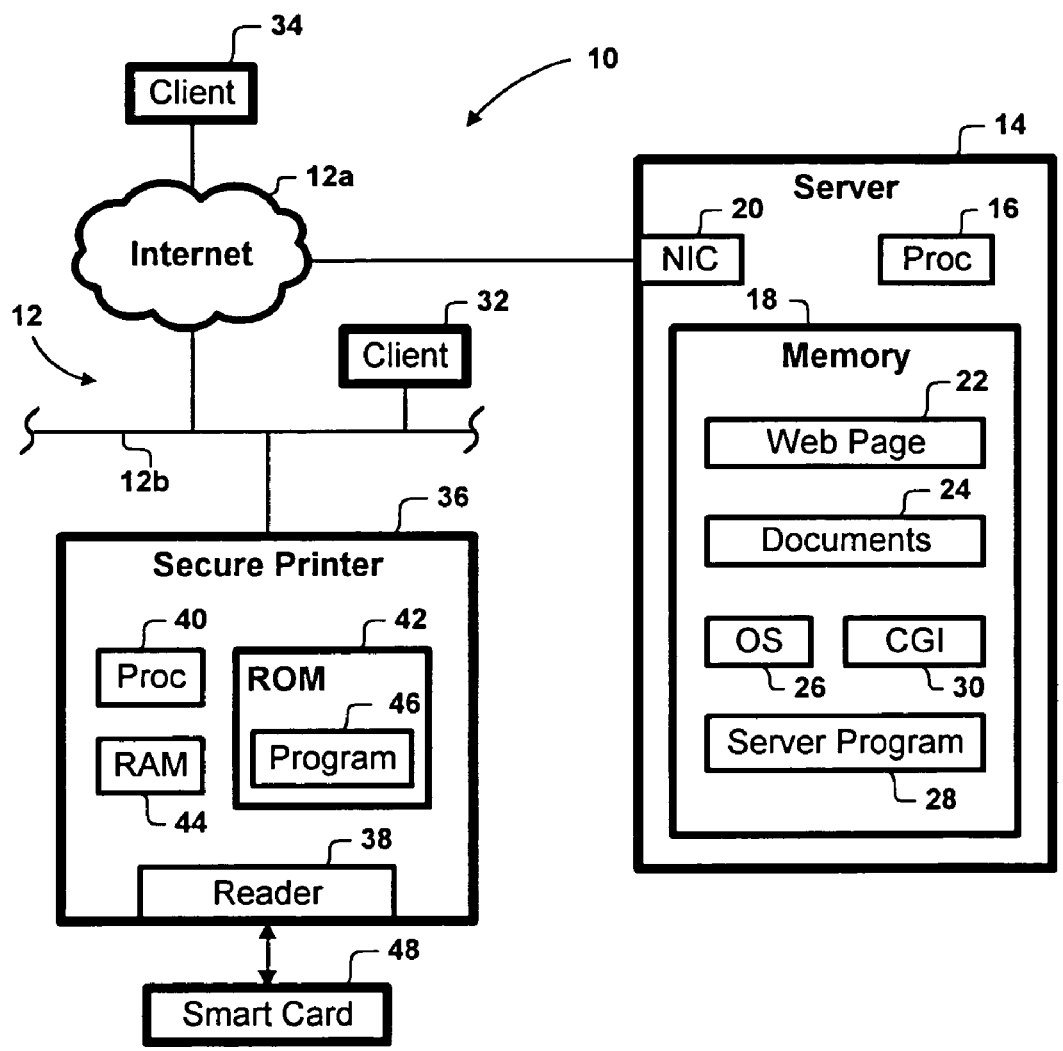
FIG. 1 is an illustration of a secure Internet-based system for the distributed printing of documents.

As shown in the drawings for purposes of illustration, the present invention is embodied in a system that allows an authorized user to select and generate hardcopies of documents in a secure, controlled manner. Security of the system is realized by an aggregate of a secure communication protocol, smart card technology and the computational infeasibility of breaking a cryptographic system. The documents may be distributed over the Internet. Therefore, document orders may be placed from any location having access to the Internet. The system may be used for electronic commerce, in which copies are made on a "pay-per-print" basis.

Reference is made to FIG. 1, which illustrates a secure system 10 for the distributed printing of documents. The system 10 includes a computer network 12 and a server 14 connected to the network 12. The network 12 is not limited to any particular type. To simplify the explanation of the invention, the system 10 will be described in connection with a network 12 including the Internet 12a and a local area network ("LAN") 12b that is connected to the Internet 12a.

The server 14 hosts a web site for distributing documents over the Internet 12a. The documents can be distributed to any client that can connect to the Internet 12a and access the web site. The server 14 includes a processor 16, memory 18 and a network interface 20. Stored in the server memory 18 are web page content 22 and a repository 24 of documents. The web page content 22 allows a client to place an order for one or more documents in the repository 24. A document may include material that contains text, images, and graphics. Also stored in the server memory 18 are an operating system 26 and a server program 28, both of which are executed during operation of the server 14. An HTTP daemon, the server program 28 runs on top of the operating system 26. The server program 28 allows the server 14 to communicate with clients connected to the Internet 12a. For example, the server program 28 can run an interface program 30 such as a CGI program or a Java applet in response to document orders and other client requests received from the Internet 12a. The interface program 30 allows the server 14 to receive document orders from clients via the Internet 12a and respond to the document orders by performing secure document distribution as described below in connection with FIGS. 3a and 3b.

Any number of clients can connect to the Internet 12a, log onto the web site and place document orders with the server 14. The clients may be any types of machines that can communicate over the Internet (e.g., personal computers, work stations, Personal Digital Assistants, Java appliances). Only two clients 32 and 34 are shown to simplify the explanation of the invention. A first client 32 is connected to the Internet 12a via the LAN 12b, and a second client 34 is connected directly to the Internet 12a. For example, the first client 32 may be a personal computer having web browser software.

A secure printer 36 is also connected to the Internet 12a via the LAN 12b. The printer 36 is not limited to any particular type. For instance, the printer 36 may be a laser printer or an ink jet printer. The printer 36 includes a smart card reader 38 and an electronics assembly. The electronics assembly, in turn, includes an Application Specific Circuit ("ASIC") having an embedded processor 40, read-only memory ("ROM") 42 and random access memory ("RAM") 44. The embedded processor 40 can communicate with the smart card reader 38, the ROM 42 and the RAM 44. Stored in the ROM 44 is a program 46 for instructing the embedded processor 40 to operate the printer 36 and communicate with the server 14 to perform secure document distribution as described below.

A smart card 48 such as a PCMCIA card may be inserted into the smart card reader 38 of the secure printer 36. The smart card 48 stores a unique cryptographic key or key pair, depending upon the type of cryptographic algorithm that is used.

Public or private key algorithms may be used. If a public key algorithm such as RSA is used, a key pair consisting of a public key KA and a private key KB is generated and stored in the smart card 48. The public key KA is used to encrypt a message M to produce an encrypted message U, and the private key KB is used to decrypt the message U. Thus, $U=E_{KA}(M)$, where $E_{KA}(\bullet)$ denotes the encryption operation with key KA; and $M=D_{KB}(U)$, where $D_{KB}(\bullet)$ denotes the decryption operation with the private key KB. Computational feasibility of breaking the encrypted message depends in part upon key length.

If a private key algorithm such as DES is used, a single session key KS is generated. The DES key KS is symmetric, that is, it is used for both encryption and decryption. Thus, $U=E_{KS}(M)$ and $M=D_{KS}(U)$. Private key encryption and decryption are generally faster to perform than public key encryption and decryption.

Figure 2:
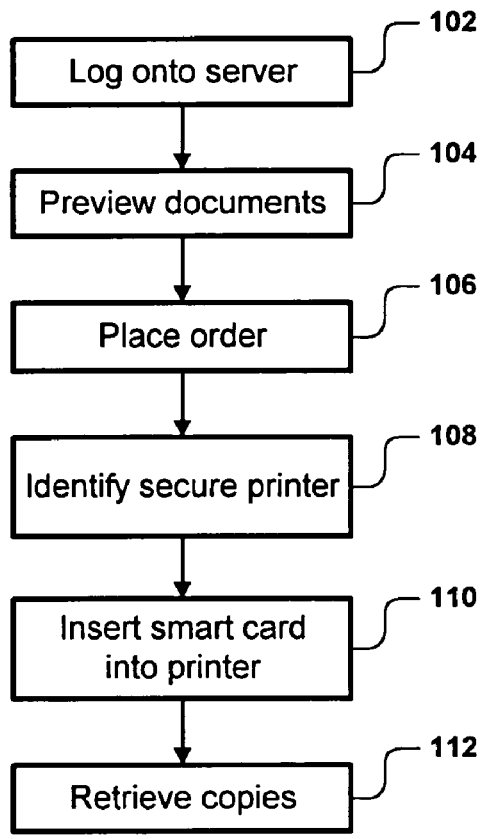
FIG. 2 is an illustration of a client-server communication during a commercial transaction.
Figure 3A:
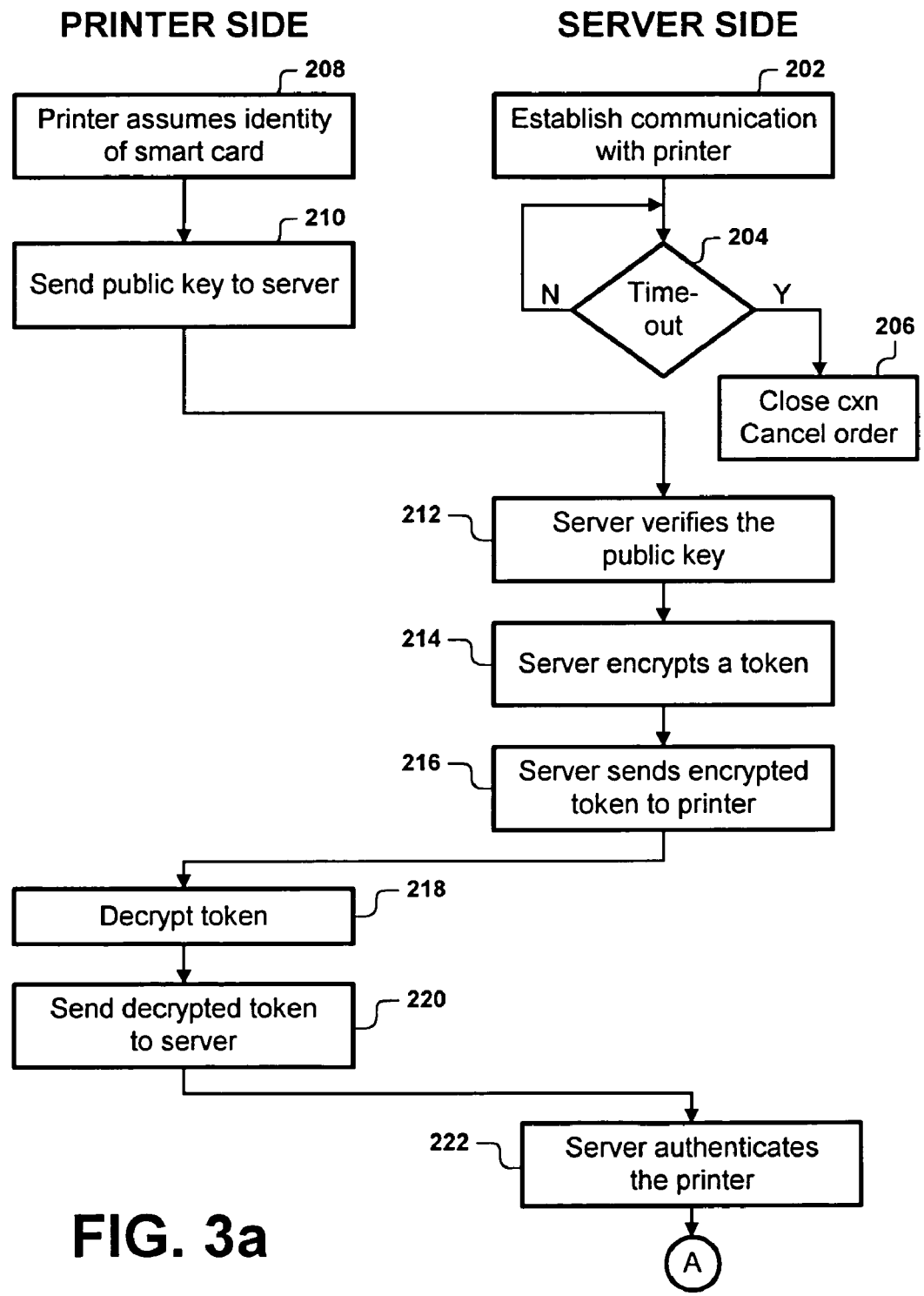
FIGS. 3a and 3b are illustrations of a printer-server communication during the commercial transaction.
Figure 3B:
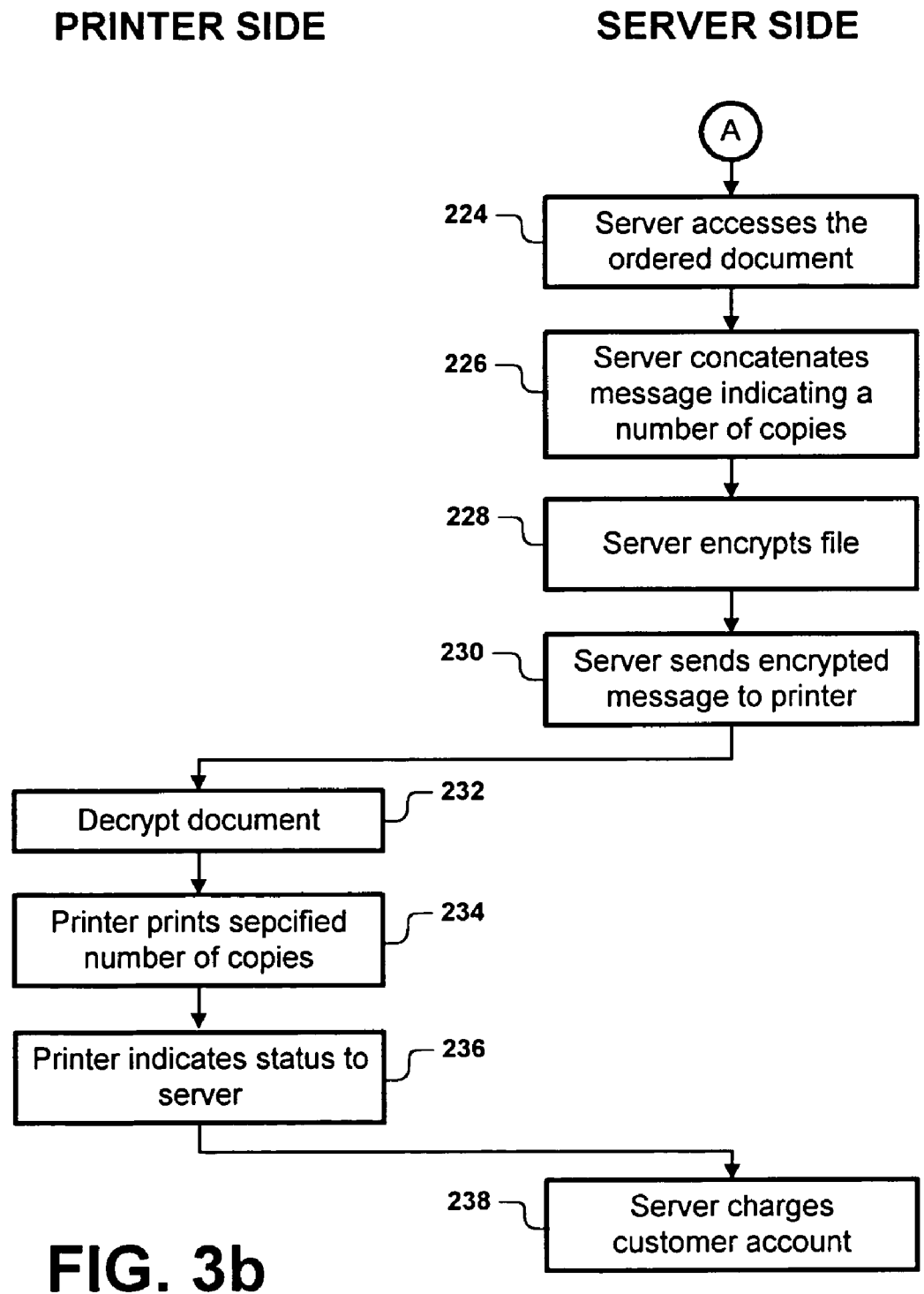

FIGS. 2, 3a and 3b illustrate a commercial transaction between a customer and the server 14. The commercial transaction is a "pay-per-print" transaction. The customer contacts a document vendor and places an order specifying a document and a number of copies. The server 14 delivers the specified document to the secure printer 36, and the secure printer 36 prints out the specified number of copies. FIG. 2 illustrates communication between the customer and the server 14; and FIGS. 3a and 3b illustrate communication between the server 14 and the secure printer 36.

Before the first commercial transaction is initiated, the customer gains access to the secure printer 36 and a smart card 48. The secure printer 36 might be located in the same room as the customer. The smart card 48 may be issued by the owner of the web site or it may be obtained from a third party such as a party maintaining the web site or a trusted certificate authority.

By way of example, public key encryption and decryption will be performed during the course of the transaction. Therefore, the smart card stores a key pair consisting of a public key KA and a private key KB.

Referring first to FIG. 2, the customer initiates the transaction by logging onto the web site of the document vendor (block 102). The customer may run a web browser on the first client 32 to log onto the web site. The customer enters the URL of the document vendor's web site and downloads different files from the server 14. The files cause the first client 32 to display the document vendor's web page. The web page advertises the vendor's documents in the repository 24 and allows the customer to order the documents. The document vendor may choose any number of ways to advertise the documents in the repository 24. Documents may be advertised by title and author lists. Abstracts and thumbnail images of the documents may also be provided.

The server 14 allows the customer to preview the documents (block 104). For example, the server 14 allows the customer to download low quality images of the documents. The low quality images may contain incomplete text (e.g., a title and synopsis) and low-resolution images that are visibly watermarked. Consequently, the preview process does not compromise the value of a high quality document. The preview/selection process discourages the customer from simply printing the preview document on the screen and, hence, obtaining it without payment because hardcopies of the preview images are of visually low quality.

To protect the integrity of visibly watermarked images, an authentication watermark may also be inserted (it is relatively easy for anyone to insert a logo of a company into an image and then claims that the image was originated from that company). In that way, the customer can verify whether the received preview images are authentic.

The customer places an order by selecting the advertised documents and specifying the number of copies of each document (block 106). The documents may be ordered and selected in many different ways according to the design of the server 14 and the customer model. For example, after previewing the documents, the customer enters selected documents in an electronic form. The customer also specifies the number of copies of each document in the form. The form already establishes the price for each document. The customer also enters a form a payment. For example, the customer might provide a credit card number, or perhaps charge an existing account with the vendor. Once filled, the formis sent to the interface (e.g., CGI) program 30 of the sever 14. Although more than one document may be selected, the transaction will be described for only a single document.

Before the order can be carried out, the customer is asked to identify the secure printer 36 to which the documents will be delivered (block 108). This will allow the server 14 to communicate with the secure printer 36. If the secure printer 36 has a URL, the customer may enter the URL of the secure printer 36.

After the order has been placed and the printer identified, the customer then inserts the smart card 48 into the card reader 38 of the secure printer 36 (block 110). The secure printer 36 becomes active and communicates with the server as described below in connection with FIGS. 3a and 3b.

If the order goes through, the server sends the document to the secure printer 36, and the secure printer 36 prints out the document in the number specified in the order. The customer then retrieves the copy or copies from the secure printer 36 (block 112). The transaction is finished.

Reference is now made to FIGS. 3a and 3b, which illustrate the communication between the server 14 and the secure printer 36 during the commercial transaction. After the secure printer 36 has been identified, the server 14 establishes a connection with the secure printer 36 (block 202). The connection is established via the Internet 12a. The server 14 then waits for the customer to insert the smart card 48 in the secure printer 36 (block 204). If the smart card 48 is not inserted within a predetermined amount of time, the server 14 times out, closes the connection with the secure printer 36 and cancels the document order (block 206).

When customer inserts the smart card 48 into the card reader 38, the printer 36 becomes active, and reads the key pair KA and KB from the smart card 48 (block 208). In this manner, the printer 36 takes on the identity of the smart card 48.

If the server 14 has not timed out, the secure printer 36 then establishes its identity with the server 14 by sending the public key KA to the server 14 (block 210). The server 14 verifies that the public key KA is a valid smart card key (block 212). For example, the server 14 can verify the public key KA by sending the public key KA to a trusted central location that associates public keys with users, or the server 14 can look up a local list of all registered users.

Once the public key KA has been verified as a valid smart card key, the server 14 proceeds to authenticate the identity of the smart card 48 and, therefore, the secure printer 36. To authenticate the identity of the secure printer 36, the server 14 generates a unique session token T and encrypts it using the public key KA (block 214). Thus, $U=E_{KA}(T)$, where U is the encrypted token. The session token T may be an arbitrary message. The encrypted token U is sent to the printer 36 via the Internet 12a (block 216).

The secure printer 36 uses the private key KB to decrypt the encrypted token U (block 218). Thus, $T'=E_{KB}(U)$. The secure printer 36 sends the decrypted token T' back to the server 14 for verification (block 220). Since only the smart card 48 and printer 36 should store the private key KB, only the printer 36 should be able to decrypt the message to produce the decrypted token T'. Thus, the server 14 verifies that the printer 36 has the identity of the smart card 48 if T=T' (block 222). At this stage, the identity of secure printer 36 has been authenticated. The authentication is performed because the list of all public keys is available as public information. It discourages any unauthorized user from implementing a device in software and/or hardware to falsely claim the identity of the smart card 48.

After the identity of the secure printer 36 has been authenticated, the server 14 accesses the file X of the ordered document from the repository 24 (block 224). The server 14 also concatenates a word to the file X, the word representing the number of copies of each document that has been ordered (block 226). This word may be inserted at the beginning of the file X or appended to the end of the file X.

The server 14 then encrypts the file X (block 228). Resulting is an encrypted message U1. Encryption is performed by using the public key KA. Thus, $U1=E_{KA}(X)$.

The encrypted message U1 is then a transmitted to the secure printer 36 (block 230). Even if the data transmission is intercepted, an eavesdropper will not be able to generate high quality copies without knowing the decryption key KB.

The secure printer 36 receives the encrypted message U1 as a bit stream and decrypts the encrypted message U1 using the private decryption key KB (block 232). Resulting is a decrypted document X'. Thus, $X'=D_{KB}(U1)$.

The secure printer 36 parses the word representing the number of copies and prints the specified number of copies of the decrypted document X' (block 234). Since decryption is performed within the secure printer 36, the customer is prevented from redirecting the decrypted document X' to an ordinary printer and generating any number of hardcopies there. Since the word representing the number of copies is encrypted, the copy number cannot be changed either. Consequently, the secure printer 36 will only print the number of copies of the document specified in the document order.

The printer 36 monitors its own actions to verify that the document has printed successfully. After the printing is completed, the printer 36 sends an acknowledgment to the server 14 to indicate that the required printing has been performed (block 236). The server 14 then logs the transaction. This triggers a billing process in which the customer's account is charged for the copies that were actually printed (block 238). If the secure printer 36 becomes jammed and does not print out all of the ordered copies, the customer will only be charged for the number of copies that were actually printed.

The form of the document that is encrypted will depend upon how and where document rendering is performed. Document rendering is preferably performed inside the secure printer 36 so that the rendered data cannot be diverted to a non-secure printer (rendered data could be diverted if rendering is performed in a software module in a host computer and the printer simply performs the physical task of putting dots on paper according to the result produced by the host software).

The secure printer 36 renders the document to generate high quality hardcopies by performing steps such as scaling, color correction, and half toning. Since the characteristics of various printers vary a great deal, the optimum half toning method depends on a variety of printer parameters such as print resolution.

Depending upon how the document is created, the optimum rendering strategy might also be different. A typical document can contain various combinations of text, images, and graphics. The optimum rendering algorithm for each of these objects (text, images, or graphics) is typically distinct. For example, graphics may be best rendered with vivid color (i.e., high saturation) and scattered-dot halftone. Images, on the other hand, may be rendered with screen-matching color and perhaps adaptive type of half toning. If the document was generated by, for example, a word processor, then the resulting file typically contains information on the various types of data in different areas within the page. Hence the optimum rendering strategy may be applied accordingly.

In a different scenario where the document is digitally scanned in from existing hardcopy archives, a segmentation algorithm may be performed to separate out the text, images, and graphics regions. The same data dependent rendering methods can then be applied.

Thus disclosed is a system that allows an authorized user to select and generate hardcopies of documents in a secure, controlled manner. Security of the system is realized by an aggregate of a secure communication protocol, smart card technology and the computational infeasibility of breaking a cryptographic system.

The system offers various countermeasures against attack. An unauthorized number of copies cannot be printed because the number is encrypted along with document. It is not accessible to user.

If a preview document is printed, the printed text will be incomplete, and the printed images will be of low quality. Preview images cannot be intercepted and corrupted because authentication watermarks make substitution detectable by user.

Even if a document from server is intercepted, the document will be encrypted. Without the decryption key, reproducing the intercepted document will be extremely difficult.

Even if the secure printer is emulated in software on another machine, the decryption keys are not available to the emulator. Therefore, the token cannot be decrypted and the emulator will not be authenticated.

The system monitors and acknowledges the printing operation. Therefore customer only pays for what is printed out.

The system may be used to implement a "pay-per-print" service for documents, where a document owner can sell documents over the Internet. The secure printing system can be useful in many business applications. One example is the trading of valuable documents or images, where a user accesses the document server through the World Wide Web and then purchases and generates hardcopies using a secure printer. The images would be of high quality, and the printer would be of such a type that can reproduce the high quality images (e.g., museum posters, brochures). The system may be used to distribute reprints from magazine articles, books that are out-of-print, and it may be used at a college bookstore to distribute course packets.

Figure 4:
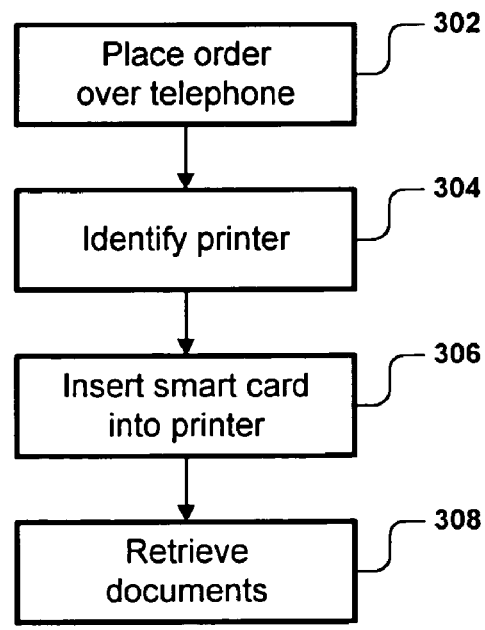
FIG. 4 is an illustration of an alternative client-server communication during the commercial transaction.

The invention is not limited to the specific embodiments described and illustrated above. Ordering a document and distributing the document may be performed on different channels. Referring to FIG. 4, the customer calls the vendor over a telephone, places an order for a document, and supplies credit card information (block 302). The customer also identifies a location of a secure printer 36 to which the customer has access (block 304). The location identifier may be an address other than a URL. After the order has been placed, the customer inserts a smart card into the identified secure printer 36 (block 306) and retrieves the documents that have been printed out (block 308). The printer 36 and server 14 may communicate as illustrated in FIGS. 3a and 3b.

The invention is not limited to electronic commerce. The invention may be used more generally to distribute documents in a secure manner to authorized users on an unsecure system, regardless of whether the users are charged for the documents.

Figure 5:
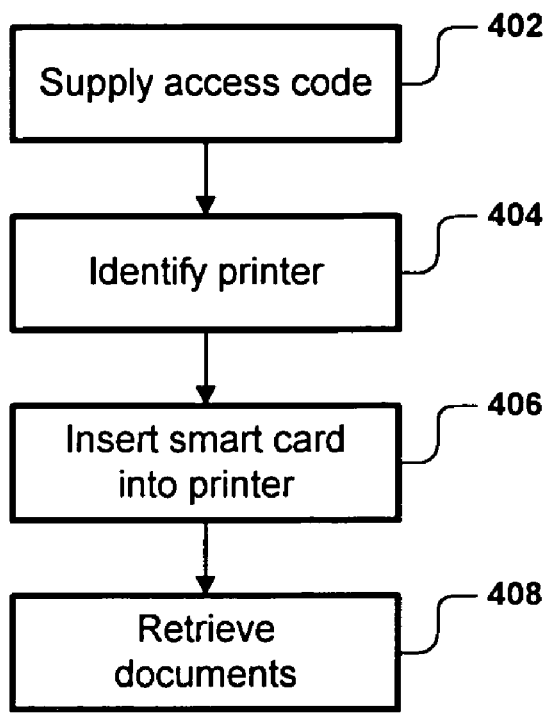
FIG. 5 is an illustration of a client-server communication during a non-commercial transaction.

In a corporate setting, for example, an employee might place a call to human resources in order to access personal records. Referring to FIG. 5, the employee gives an employee ID, pin number or some other access code (block 402) and identifies a secure printer to which the documents will be delivered (block 404). If the secure printer is connected to a local server via a local area network, the employee might identify the secure printer by printer number. The employee then inserts the smart card in the identified printer (block 406) and retrieves the documents that are printed out. The printer and server may communicate as illustrated in FIGS. 3a and 3b, except that the customer is not charged for the printed documents.

The smart card is not limited to a PCMCIA card. For example, the smart card may be a laminated plastic card having a magnetic strip for storing the cryptographic key(s).

Private key encryption may be used in conjunction with public key encryption. For instance, a secure printer randomly generates a unique session key KS that is used for encryption and decryption of the selected documents. The session key KS is encrypted with a public key of the server and sent to the server. The server decrypts the session key with its private key. The server later encrypts the selected documents using the session key and transmits the encrypted document to the printer. The printer then uses the session key to decrypt the document. Thus, decryption and printing are performed in the same way as before, except that the private key cryptographic system is used in combination with the public key cryptographic system.

In an alternative implementation, the server could generate the random session key and encode it along with the session token. Then, in addition to decrypting the session token and sending it back to the server for verification, the printer would also decrypt the session key KS which, in turn, will be used to decrypt the encrypted documents. This alternative implementation can reduce the total number of printer—server communications performed during a session.

Instead of using a computer to preview and select documents, this functionality can be integrated into the secure printer. Resulting is a standalone client machine. Such a printer may run a Java Virtual Machine, and it may include a keypad for entering the URL of the web site on the document server and a simple display for allowing a customer to preview and select documents. Such an integrated approach is appropriate if the client is set up as a printing kiosk or dedicated system.

The cryptographic key(s) may be embedded in the ROM of the printer. Thus, the printer becomes trusted, not the holder of the smart card.

Figure 6:
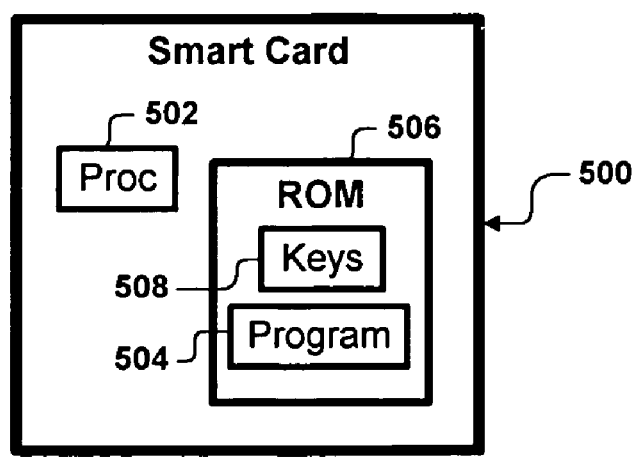
FIG. 6 is an illustration of a smart card for the system.

The smart card may perform decryption instead of the printer. Referring to FIG. 6, a smart card 500 such as a PCMCIA card includes an embedded processor 502 and store an encryption algorithm 504 and at least one encryption key 508 in ROM 506. The decryption is performed entirely within the smart card 500. Results would be passed to the printer. Thus, the printer passes the encrypted token and document from the network to the smart card, and the smart card passes the decrypted token and document to the printer. An advantage of performing the decryption entirely within the smart card 500 is that the private decryption key never needs to be revealed outside of the smart card. This adds another level of security to the system. Moreover, having the smart card 500 perform decryption unloads some computational burden from the secure printer.

Accordingly, the invention is not limited to the specific embodiments described and illustrated above. Instead, the invention is construed according to the claims that follow.

What is claimed is:

1. A method of using a printer to print a document stored on a server, the server being connected to a network, the method comprising:

placing an order for the document to be distributed to the printer;

establishing a connection between the server and the printer to which the document will be distributed, after the order is placed;

using a smart card to give an identity to the printer within a predetermined amount of time of the establishing of the connection, the printer not having the identity until the identity is given, wherein the identity includes at least one cryptographic key contained on the smart card; and wherein the server times out, the server closes the connection established with the printer, and the server cancels the placed order if the smart card fails to give the identity to the printer within the predetermined amount of time and if the smart card gives the identity to the printer within the predetermined amount of time, the order for the document is further processed by;

using the printer and the at least one cryptographic key to establish the printer identity with the server in response to the smart card giving the identity to the printer within the predetermined amount of time, wherein the server encrypts the document and transmits the encrypted document to the printer via the network;

using the printer to receive the encrypted document from the network;

using the printer to decrypt the encrypted document; and using the printer to print the decrypted document.

2. The method of claim 1, wherein the encrypted document includes a message indicating a number of copies to be printed; and wherein the printer prints the number of document copies indicated in the message.

3. The method of claim 1, wherein the printer includes a smart card reader; and wherein the printer identity is established by inserting a smart card into the reader and transferring the identity of the smart card to the printer at the time of document distribution.

4. The method of claim 3, wherein the smart card is used to perform the decryption.

5. The method of claim 1, wherein the printer includes an embedded processor, and wherein the embedded processor is used to perform the decryption.

6. The method of claim 1, further comprising the step of ordering the document prior to establishing the printer identity.

7. The method of claim 6, wherein the printer is used to order the document.

8. The method of claim 6, further comprising the step of previewing at least one low quality document prior to ordering the document.

9. The method of claim 1, further comprising the step of using at least one cryptographic key to authenticate the printer prior to ordering the document.

10. The method of claim 1, wherein the printer is used to render the decrypted document.

11. A method of using a printer to distribute a document stored on a server, the method comprising:

placing an order for the document to be distributed to the printer;

establishing a connection between the server and the printer to which the document will be distributed, after the order is placed;

using the printer and at least one cryptographic key to establish a printer identity with the server within a predetermined time of the establishing of the connection, wherein the server times out, the server closes the connection established with the printer, and the server cancels the placed order if the printer fails to give the printer identity to the server within the predetermined amount of time and if the printer gives the printer identity to the server within the predetermined amount of time the server encrypts the document and transmits the encrypted document to the printer via a network and the order for the document is further processed by:

using the printer to receive the encrypted document from the server;

using the printer to decrypt the encrypted document;

using the printer to print the decrypted document; and using the printer to indicate status of the printing so that the server can charge for copies that were actually printed, wherein the printer sends back a status acknowledgement to the server.

12. A system for the distributed printing of documents over a computer network, the system comprising:

a server connected to the network, the documents being stored on the server, wherein the server is operable to establish a connection with a printer;

a client machine connected to the network for placing a document order and identifying the printer to which the documents will be distributed to allow the server to establish a connection with the printer after the document order is placed;

the printer connected to the network, the printer being programmed to receive at least one cryptographic key after the document order has been placed and use said at least one key to establish a printer identity, and then to establish the printer identity with the server via the network, within a predetermined amount of time of the server establishing the connection with the printer;

the server being programmed to encrypt at least one of the documents and to send the at least one encrypted document to the printer via a network after the document order has been placed and the printer identity has been established, wherein the server times out, the server closes the connection established with the printer, and the server cancels the document order if the printer fails to give the printer identity to the server within the predetermined amount of time and if the printer gives the printer identity to the server within the predetermined amount of time, the server does not time out, does not close the connection established with the printer, and does not cancel the document order;

the printer being further programmed to retrieve the at least one encrypted document, decrypt the retrieved at least one encrypted document, and print the decrypted document according to the document order.

13. The system of claim 12, further comprising a client for placing the document order.

14. The system of claim 13, wherein the printer stores low quality documents for customer preview.

15. The system of claim 12, further comprising a smart card for providing at least one cryptographic key to the printer and for performing the decryption, the smart card passing the decrypted document to the printer.

16. The system of claim 12, further comprising a smart card for providing at least one cryptographic key to the printer, and wherein the printer includes an embedded processor for using at least one cryptographic key to perform the decryption.

17. The system of claim 12, wherein the printer is further programmed to indicate status of the printing so that the server can charge for copies that were actually printed.

18. A network printer comprising:

means for establishing a connection with a remote site over a network, wherein the remote site includes a server storing a document, and wherein the connection is established after an order for the document is placed;

means for reading at least one decryption key from a smart card;

means for using the at least one decryption key to establish a printer identity, wherein the printer identity includes at least one cryptographic key contained on the smart card;

means for communicating the printer identity to the server within a predetermined amount of time of establishing the connection with the remote site, wherein the server times out, the server cancels the order for the document, and the server closes the connection established with the network printer if the network printer fails to give the printer identity to the server within the predetermined amount of time, and if the printer gives the printer identity to the server within the predetermined amount of time the server does not time out, does not cancel the order for the document, and does not close the connection established with the network printer to allow the server to encrypt the document and transmit the encrypted document to the network printer;

means for receiving an encrypted token from the remote site;

means for using a decryption key to decrypt the token; and means for sending the decrypted token to the remote site.

19. A network printer that can communicate with a document server, the printer comprising:

a smart card reader;

a network interface for receiving a print order for a document and for establishing a network connection with the document server after the print order is received, wherein the document server stores encrypted documents;

a processor; and memory for storing a program that, when executed, causes the processor to use the smart card reader to read a cryptographic key from a smart card, use the cryptographic key to create an identity for the printer;

use the network interface to establish the identity with the document server within a predetermined amount of time of establishing the network connection with the document server, wherein the document server times out, the document server closes the connection established with the network printer, and the document server cancels the print order for the document if the identity is not established within the predetermined amount of time and if the identity is established within the predetermined amount of time, the processor is further configured to, use the network interface to receive the document, which has been encrypted by the document server and transmitted to the network printer via a network, decrypt the encrypted document, and print the decrypted document.

20. The printer of claim 19, further comprising a keypad and display; wherein the program further causes the processor to receive a document order from the keypad.

21. The printer of claim 19, wherein the program further causes the processor to send printing status to the network interface so that the server can charge for copies that were actually printed, wherein the printer sends back a status acknowledgement to the server.

22. The printer of claim 19, wherein the program further causes the processor to parse a message from the decrypted document, the message indicating a number of ordered copies, and wherein the program further causes the processor to print the ordered number of copies of the decrypted document.

23. The printer of claim 19, wherein the program further causes the processor to render the decrypted document.

24. The printer of claim 18, further comprising:

means for receiving an encrypted document from the network;

means for using a decryption key to decrypt the document; and means for printing the decrypted document.

25. A server storing a document comprising:

means for receiving a print order for the document;

means for establishing a connection with a remote network printer after receiving the print order;

means for receiving a message identifying the remote network printer;

means for receiving a cryptographic key from the remote network printer within a predetermined amount of time of establishing the connection with the remote network printer;

means for encrypting the document using the cryptographic key received from the network printer;

means for closing the connection established with the remote network printer and canceling the print order for the document if the server fails to receive the cryptographic key from the remote network printer within the predetermined amount of time, and if the server receives the cryptographic key from the remote network printer within the predetermined amount of time, not closing the connection established with the remote network printer and not canceling the print order for the document;

means for encrypting a token with the key;

means for sending the encrypted token to the remote network printer;

means for determining whether the remote network printer was able to decrypt the token; and means for sending encrypted information directly to the remote network printer via a network if the remote network printer was able to decrypt the token.

26. The method of claim 1, wherein using the printer and at least one cryptographic key to establish the printer identity with the server includes:

using an encryption key to establish a printer identity;

receiving an encrypted token from the server;

using a decryption key to decrypt the token; and sending the decrypted token to a remote site.

27. The method of claim 11, wherein using the printer and at least one cryptographic key to establish a printer identity with the server includes:

using an encryption key to establish a printer identity;

receiving an encrypted token from the server;

using a decryption key to decrypt the token; and sending the decrypted token to a remote site.

28. The system of claim 12, wherein the printer establishes the printer identity with the server by using the at least one decryption key to establish a printer identity; receiving an encrypted token from the server; using a decryption key to decrypt the token; and sending the decrypted token to the server.

29. The printer of claim 19, wherein using the network interface to establish the identity with the server includes receiving an encrypted token from the server; using a decryption key to decrypt the token; and sending the decrypted token to the server.

* * * * *

UNITED STATES PATENT AND TRADEMARK OFFICE
CERTIFICATE OF CORRECTION

PATENT NO. : 7,248,693 B1
APPLICATION NO. : 09/483183
DATED : July 24, 2007
INVENTOR(S) : Daniel R. Tretter et al.

Page 1 of 1

It is certified that error appears in the above-identified patent and that said Letters Patent is hereby corrected as shown below:

On the title page, item (75), in "Inventors", in column 1, line 1, delete "Mtn. View" and insert -- Palo Alto --, therefor.

In column 1, line 42, delete "per-per-print" and insert -- pay-per-print --, therefor.

In column 9, line 54, in Claim 11, delete "by:" and insert -- by; --, therefor.

In column 10, line 32, in Claim 14, delete "printer" and insert -- server --, therefor, In column 10, line 40, in Claim 16, delete "printer," and insert -- printer; --, therefor.

Signed and Sealed this

Seventeenth Day of November, 2009

David J. Kappos
*Director of the United States Patent and Trademark Office*